United States Patent [19]
Lachat

[11] Patent Number: 5,882,033
[45] Date of Patent: Mar. 16, 1999

[54] SEAT-INTEGRATED AIR BAG DEPLOYMENT DOOR

[75] Inventor: Michael J. Lachat, Shelby Township, Mich.

[73] Assignee: Breed Automotive Technology, Inc., Lakeland, Fla.

[21] Appl. No.: 847,269

[22] Filed: May 1, 1997

[51] Int. Cl.⁶ ................................................. B60R 21/16
[52] U.S. Cl. ................................... 280/728.3; 280/730.2
[58] Field of Search .............................. 280/728.3, 730.2

[56] References Cited

U.S. PATENT DOCUMENTS

| | | | |
|---|---|---|---|
| 5,451,075 | 9/1995 | Parker et al. | 280/728.3 |
| 5,667,242 | 9/1997 | Slack et al. | 280/728.3 |
| 5,676,394 | 10/1997 | Maly | 280/728.3 |

*Primary Examiner*—Kenneth R. Rice
*Attorney, Agent, or Firm*—Markell Seitzman

[57] ABSTRACT

A seat-integrated air bag deployment door (10) is provided having a rim (22) which defines a deployment opening. The deployment door (10) is configured for attachment to the seat material (18) of a vehicle seat (14) by sewing or gluing. A door conceals the deployment opening and tears at predetermined locations during deployment of the air bag (102) to allow the air bag to deploy therethrough.

18 Claims, 5 Drawing Sheets

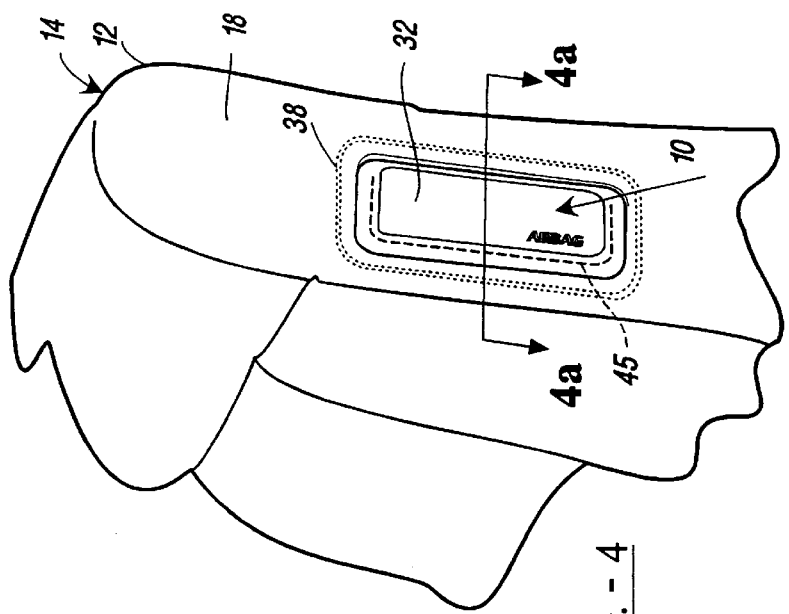
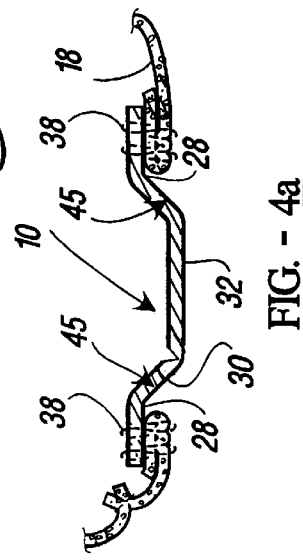
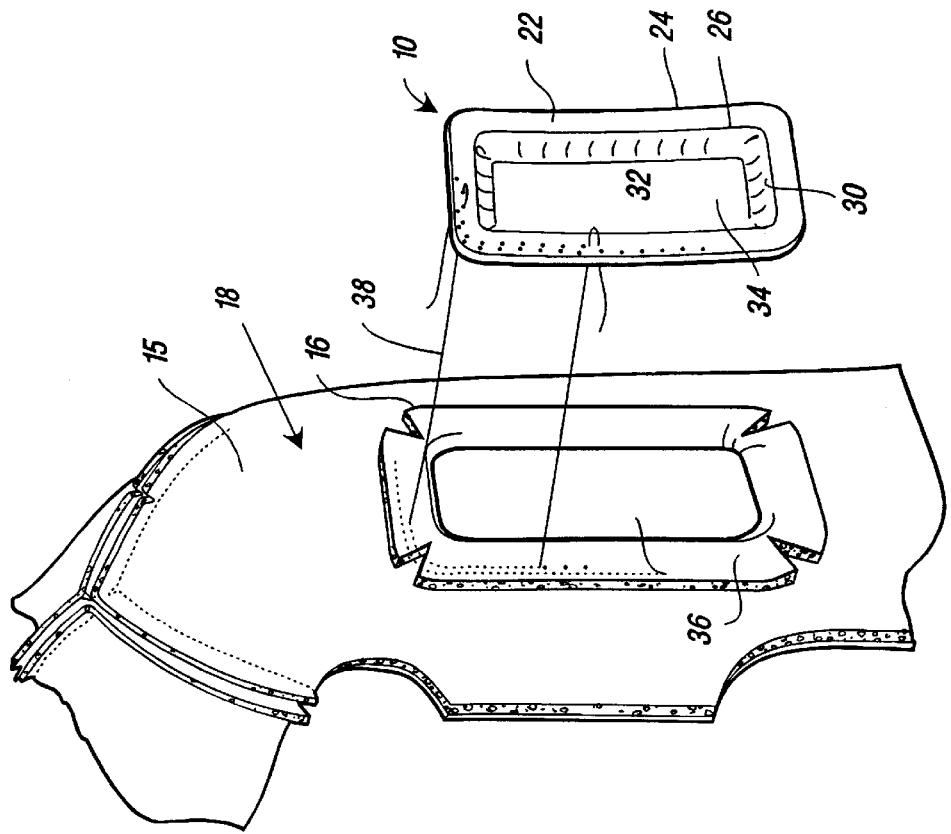

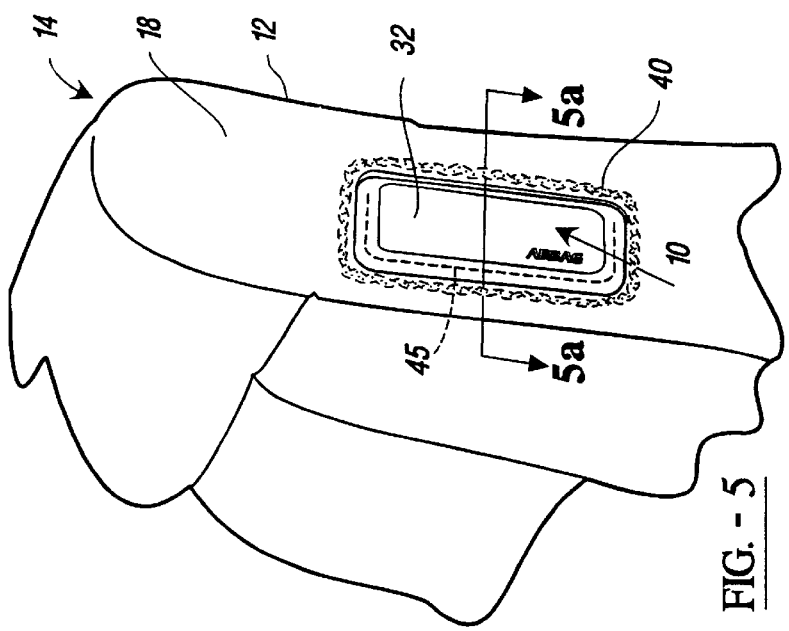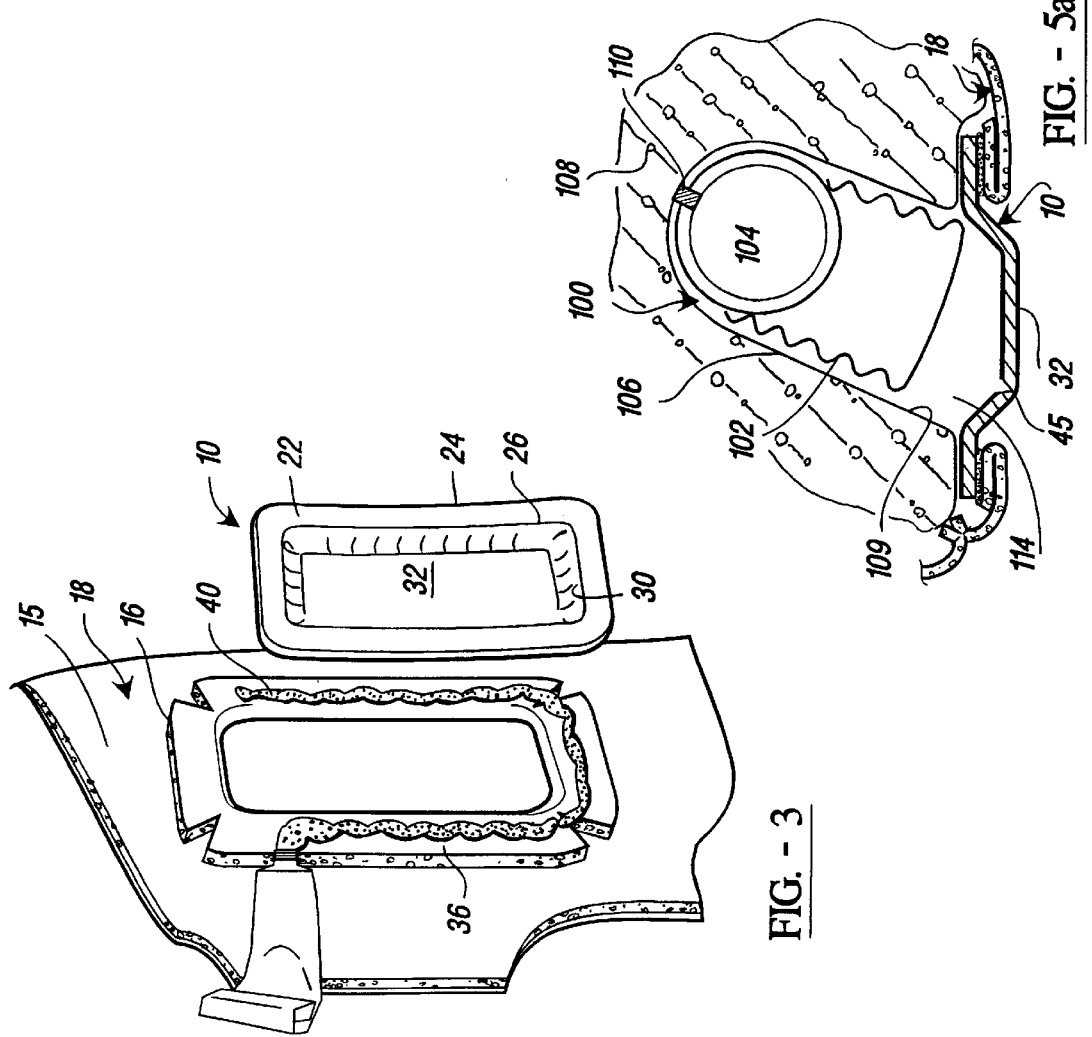

SEAT-INTEGRATED AIR BAG DEPLOYMENT DOOR

BACKGROUND AND SUMMARY OF THE INVENTION

The present invention relates generally to air bag systems and more specifically to a seat-integrated air bag deployment door configured to be attached to the seat material for side impact occupant protection systems.

Side impact occupant protection systems intended to protect vehicle occupants during a side impact collision generally introduce an air bag between the occupant's torso and the interior of the vehicle. U.S. Pat. No. 3,617,073 is illustrative of a system in which the air bag protective system is located within a vehicle door. British Patent Specification 1,450,666 introduces the air bag from a top rail or roof while British Patent No. 2,232,936B shows an air bag formed within a seat, and deployed though an air bag deployment door mounted to the seat back.

With regard to seat mounted air bag systems, an air bag module capable of deploying an air bag through an air bag deployment door is positioned within the seat back. Conventional air bag deployment doors consist of a frame affixed to the seat back which defines the perimeter of the deployment opening. A soft cover or a rigid door is affixed to the frame and used to close and seal the deployment opening. The frame is generally comprised of sheet metal or molded plastic to stiffen and stabilize the seat material in the regions extending around the perimeter of the deployment opening. The frame is stabilized by anchoring flanges or tabs connecting the frame to a rigid housing within the seat back. This type of construction presents difficulties in aligning the seat material around the frame, since the seat material often pleats, folds or puckers along the seat material-frame boundary.

Further, the use of a metal frame and a rigid housing for anchoring the frame places metal components within the seat back which may cause seat discomfort to the occupant. Also, the metal frame is not attached to the seat material and may shift. As a result, it is difficult to know the exact location through which the inflating air bag will deploy through the seat seam.

It is an object of the present invention to provide a side impact air bag deployment door that can endure extreme temperatures and is compatible with seat design.

A further object of the invention is to provide a side impact air bag deployment door which is attached to the seat material and is capable of allowing the air bag to quickly and effectively deploy through a consistent route of deployment.

Accordingly, the invention includes a soft, flexible seat-integrated air bag deployment door or cover having a rim and crown construction. The deployment door is preferably sewn or glued to the seat material about an opening in the material. The door localizes the energy of an inflating air bag to a tear region or seam of the soft door or cover. The tear region tears during deployment of the air bag, thereby permitting the air bag to deploy therethrough. The seat-integrated air bag deployment door is compatible with seat design and does not require any metal components to cause discomfort to the occupant. In a second embodiment of the invention the seat material extends across the cover and the cover is used to rip open the seat material permitting the air bag to expand therethrough.

The present invention also includes a method of attaching the seat-integrated air bag deployment door to the seat material of a vehicle seat. This method comprises the steps of positioning the deployment door on the seat material substantially over a cutout portion in the vehicle seat material or at a location in the seat material which will be torn open by the door; positioning the seat material around a rim wall portion of the deployment door, such that the seat material lies beneath a front planar surface of the rim (or in the case of the alternate embodiment over the rim and the rest of the cover); and sewing or gluing the front planar surface to the seat material.

Many other objects and purposes of the invention will be clear from the following detailed description of the drawings.

BRIEF DESCRIPTION OF THE DRAWINGS

In the drawings:

FIG. 2 is an assembly view showing the seat-integrated deployment door being sewn to the seat back covering material;

FIG. 3 is an assembly view showing the seat-integrated deployment door being glued to the seat back covering material;

FIG. 4 is a perspective view of a seat back and deployment door connected to the seat back covering material by sewing;

FIG. 4A is a cross-sectional view taken along line 4A—4A in FIG. 4;

FIG. 5 is a perspective view of the deployment door glued to the seat back covering material;

FIG. 5A is a cross-sectional view taken along line 5A—5A in FIG. 5 and also shows the location of an air bag and inflator;

DETAILED DESCRIPTION OF THE DRAWINGS

The present invention is applicable to various air bag modules constructed to deploy an air bag into the passenger compartment during a side impact collision, such as the "Side Impact Soft Pack Air Bag Module" which is described and illustrated by U.S. Pat. No. 5,547,214 issued to Zimmerman, II et al., the contents of which are incorporated herein by reference.

Figure 1:
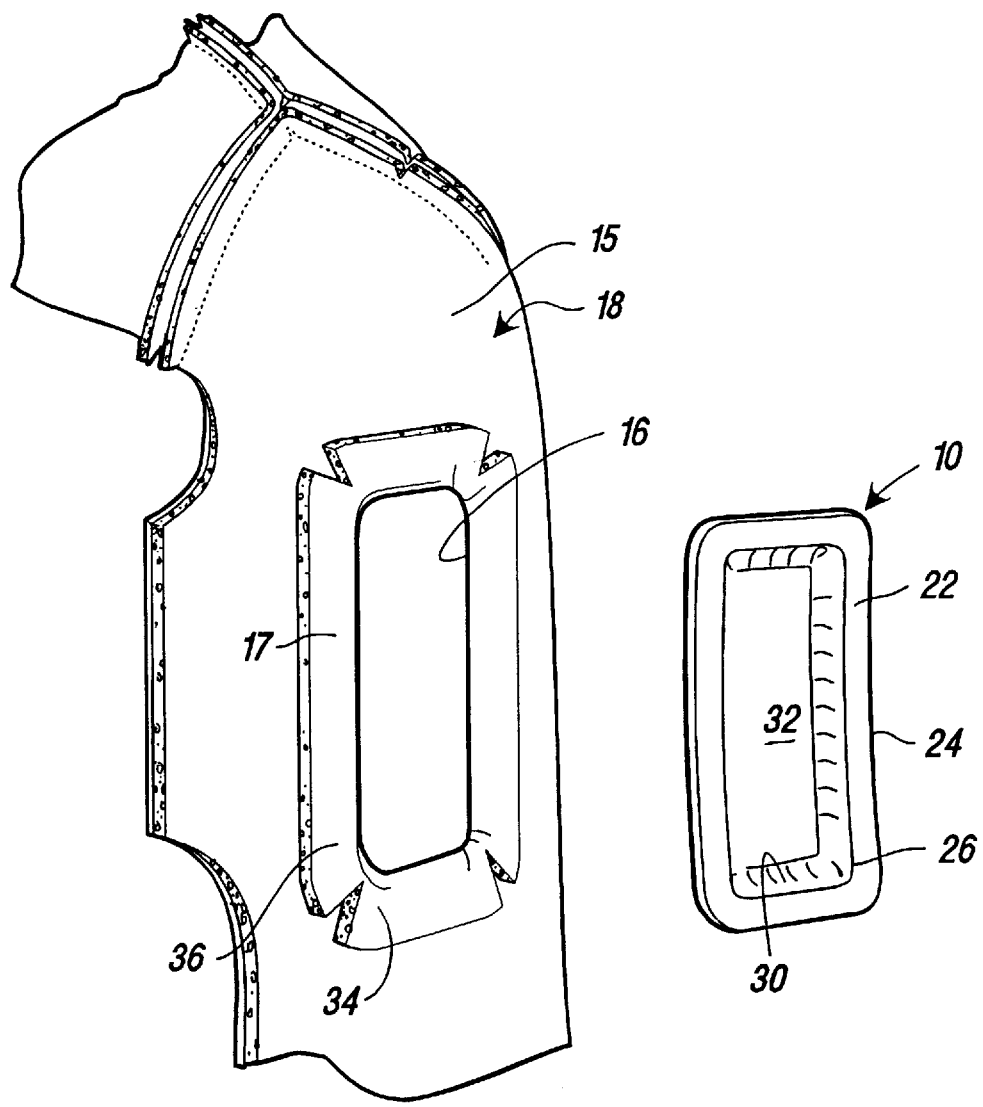
FIG. 1 illustrates a partial assembly view of an automotive seat covering material, turned inside-out and the seat-integrated air bag deployment door of the present invention positioned remote from the material.

FIG. 1 shows a preferred embodiment of the seat-integrated air bag deployment door (or cover) generally indicated by numeral 10 and spaced apart from a seat back covering material 18. The door 10 is preferably made from a soft, pliable plastic (such as TPO and TPE) capable of withstanding high temperatures. It should be appreciated that in FIG. 1, the covering material 18 is inside-out. The material 18 includes a cutout portion or opening 16 in a side portion 15 thereof that will be installed facing a side of the vehicle with edges 17 of the material folded back to reinforce the opening 16. The location of the opening 16 in the side 15 of the material is chosen such that when the material is installed upon the seat back, the opening (and the attached door) are positioned above a deployment channel in the seat (see FIG. 5A).

The seat-integrated air bag deployment door 10 of the present invention is formed, molded or extruded, preferably of a plastic material, having a rectangular, peripheral collar or rim 22 with an outer boundary 24 measuring approximately 200 mm (8 inches) in length and 125 mm (5 inches) in width. The width of the rim is approximately 25 mm (1 inch). The door 22 further includes integrally formed tapered walls 30, which extend from an inner boundary or edge 26 of the rim, and terminate at a crown 32. The walls 30 have a depth of about 3 mm (0.125 inch). A front face 28 (shown more clearly in FIG. 4A) of the door 10 is identified as 28. The edge 26 and walls 30 define the perimeter of a deployment channel 34 through which the air bag will expand.

As will be seen from the description below, the walls 30 and top or crown 32 of the door 10 are inserted into the opening 16 with the front face 28 of the rim 22 placed against the seat covering material surrounding the opening 16. The rim 22 is thereafter secured to the material 18. To insure that the rim and material are robustly connected together, the material 18, is folded back (at 17) upon itself to provide at least a double material layer 36 of material about the opening 16.

Reference is now made to FIGS. 2 and 3 which illustrate two preferred methods for permanently attaching the deployment door 10 to the double layer 36 of seat material 18. In FIG. 2 the rim 22 of the deployment door 10 is attached to the seat material 18 by sewing. Stitches 38 fasten the rim 22 of the deployment door 10 directly to the seat material 18. In FIG. 3 the rim 22 is attached to the seat material 18 by gluing. Glue 40 is applied directly to the seat material 18 (or to the rim of the cover) and the deployment door 10 is affixed thereto. Again, it should be appreciated that the covering material of FIGS. 2 and 3 is shown inside-out. The covering material is turned right-side-out (see FIG. 4) and fitted about a seat back generally shown as 12 of an automotive seat 14.

The flexible soft cover or door 10 includes a weakened or thinned region defining a tear seam 45 which permits the top 32 or the sides 30 to separate from the other portions of the door 10 during deployment of the air bag as further discussed below. The tear seam 45 may be located in the sides 30 or in the top or crown 32. FIG. 4A is a partial cross-sectional view illustrating the deployment door 10 attached to the seat material 18 by sewing and FIG. 5 shows the deployment door 10 attached to the seat material 18 by gluing. FIG. 5A shows the location of an air bag module 100 (which is equally applicable to FIG. 4A) including an air bag 102 and inflator 104 positioned within the pocket 106 formed in the seat foam 108 of the seat back 12. The inflator 104 is connected to a seat frame 110 at the desired location. As can be appreciated, when the covering material 18 is installed upon the foam 108, the deployment door 10 is positioned at the opening 114 (deployment opening) of a channel 109.

Figure 6:
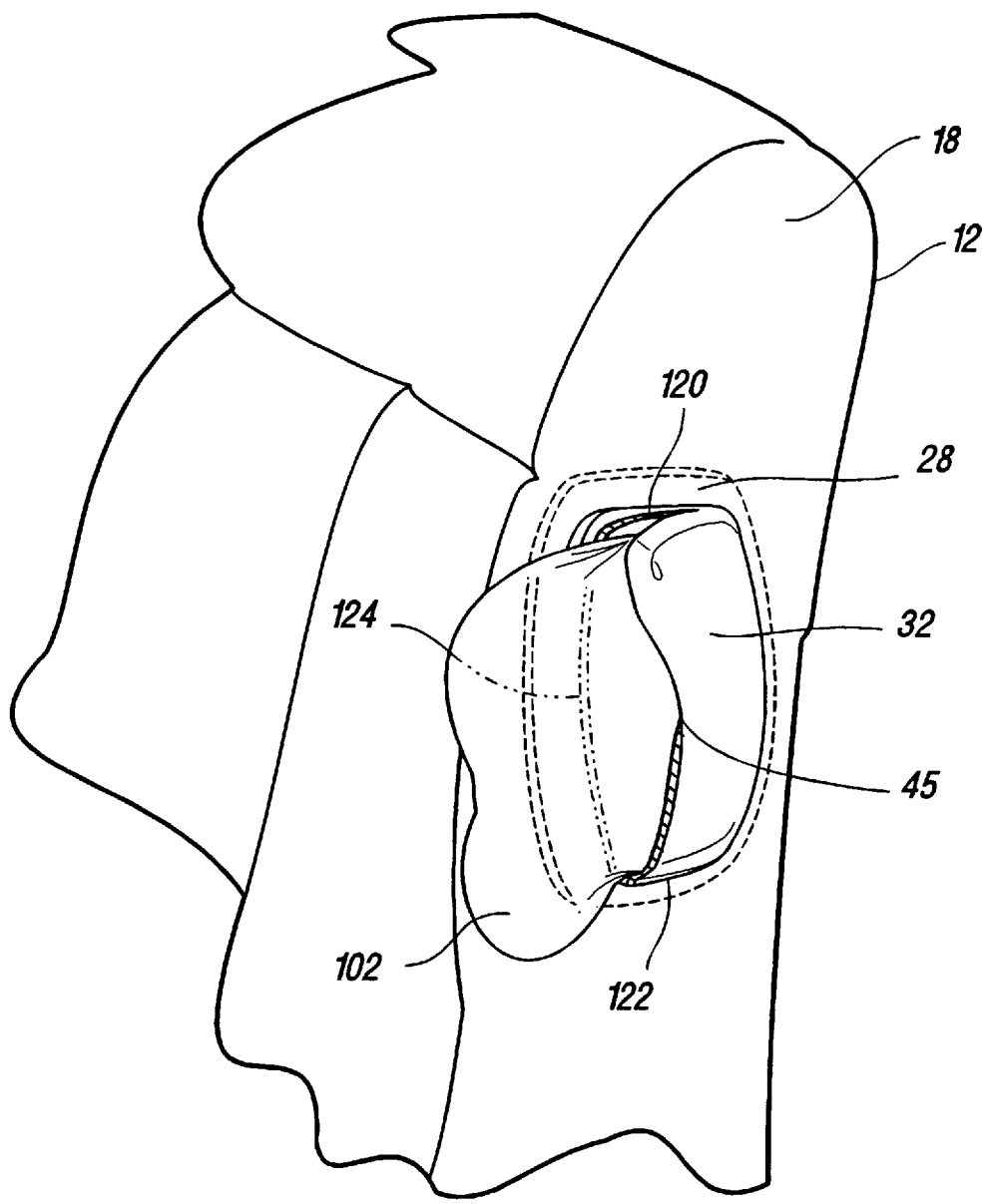
FIG. 6 is a perspective view of an air bag being deployed through the deployment cover of the present invention through a tear seam along the left leading edge of the soft flexible cover.

Reference is made to FIG. 6 which illustrates further details of the present invention. As illustrated the deployment door 10 includes a tear region 45 that includes an upper 120, lower 122 and forward edge 124 of the walls or crown of the door. The method of attaching the flexible soft cover 42 to the deployment door 10 entails sewing the various panels of seat covering material together to from a covering for a seat back, locating an opening in a side panel 15 of the assembled covering material such that the opening will be aligned to a deployment channel formed in the seat after the covering material is positioned upon the seat back, reinforcing the edges of the covering material about the opening 16 and attaching the door 10 to the covering material and locating the tear regions of the door 10 over the deployment channel opening 114. This configuration enables the energy created by the inflating air bag 44 to cause only the left side of the flexible soft cover 10 to tear open. The right edge of the top 32 does not include a tear region and acts as a hinge about which the torn open portions of the door 10 may rotate. As a result, the air bag 102 deploys only form the left side of the flexible soft cover 42.

Figure 8:
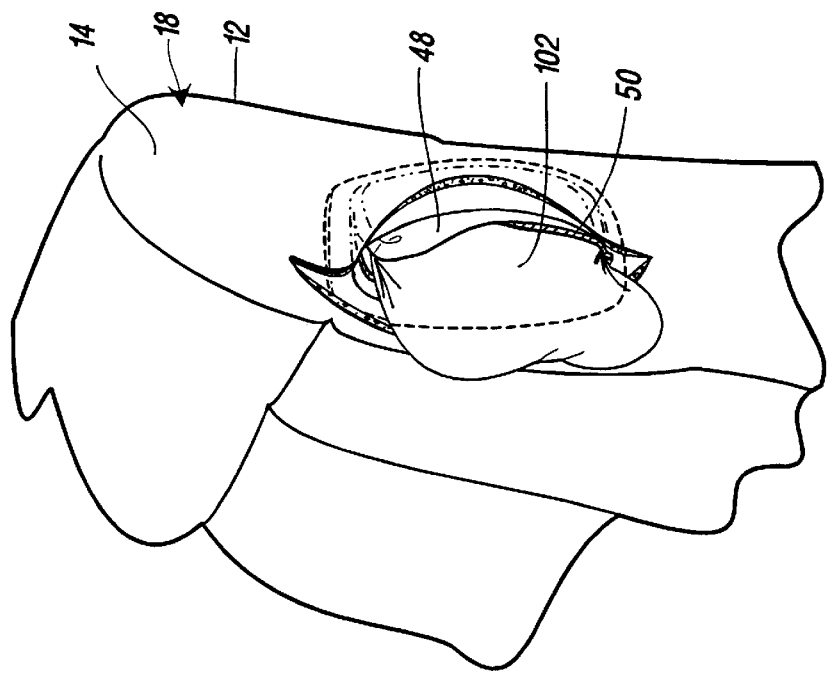
FIG. 8 is a perspective view of the air bag being deployed through the tear seam running along the longitudinal axis of the soft flexible cover and breaking through the covering seat material of FIG. 7A.
Figure 7:
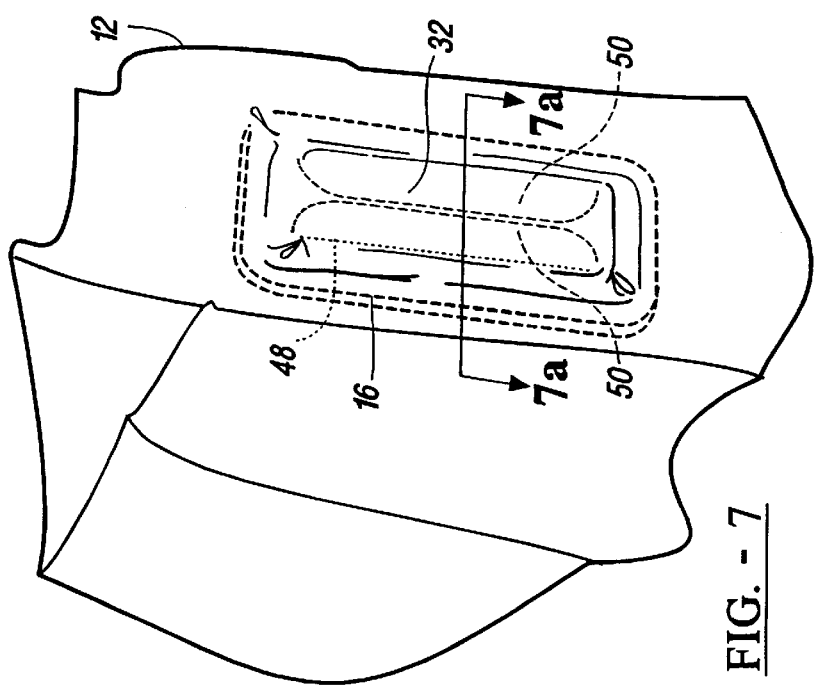
FIG. 7 is an alternate embodiment of the invention.
Figure 7A:
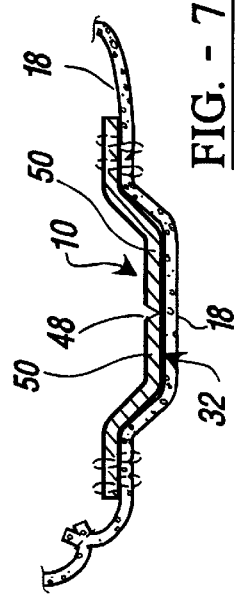
FIG. 7A is a cross-sectional view taken along line 7A—7A in FIG. 7 illustrating the deployment door being concealed from view by the seat material.

An alternative embodiment of the invention is shown in FIGS. 7–8. In this embodiment a tear seam 48 (dotted line) primarily extends through the center of the flexible soft door 10. The tear region or tear seam 48 is formed in an H pattern defining two door panels 50 in the door 10. As the air bag 44 inflates it creates energy which forces the tear seam 48 to tear and separate the two door panels 50. As can be appreciated this alternate embodiment with the two door panels could be used in the embodiment of the earlier figures. Further, in this embodiment, the seat material 18 overlays and conceals the flexible soft cover or door 10 from view, as illustrated in FIG. 7A. Therefore, during deployment of the air bag 102, the seat material 18 overlaying the flexible soft cover 10 must be torn away by the torn edges of each of the panels 50 proximate the tear seam 48.

FIG. 8 shows the door 10 of FIG. 7 after the air bag has been inflated and the seat material 18 has been ripped open allowing the air bag to expand therethrough.

Many changes and modifications in the above-described embodiment of the invention can, of course, be carried out without departing from the scope thereof. Accordingly, that scope is intended to be limited only by the scope of the appended claims.

I claim:

1. An air bag deployment door (10) for a vehicle seat (14), comprising:

a rim (22) defining a central passage and a crown raised above the rim, the rim being attached directly and only to a portion of a seat covering material (18) of the vehicle seat (14) which upon assembly of the material upon a vehicle seat, the rim and crown overlays a deployment channel in the seat through which an air bag deploys.

2. The door (10) as defined in claim 1 wherein the covering material includes an opening (16) therein and wherein the rim of the deployment door is secured to the material generally proximate to the edges of the opening (16).

3. The doors as defined in claim 1 wherein the covering material directly overlays the rim and crown.

4. The deployment door (10) of claim 1, wherein said rim (22) includes an extending wall portion (30) which is positioned within the opening in the material.

5. The deployment door (10) of claim 1, wherein said rim (22) is attached to the seat material (18) by sewing.

6. The deployment door (10) of claim 1, wherein said rim (22) is attached to the seat material (18) by gluing.

7. The deployment door (10) of claim 1, wherein the crown (32) is joined to the wall portion (30) which projects out of the covering material.

8. The deployment door (10) of claim 7, wherein said door (42) is made from an elastomeric or flexible material.

9. The deployment door (10) of claim 7, including at least one tear region (45, 48) which tears during deployment of an air bag (102) deployed from an air bag module within the vehicle seat (14).

10. The deployment door (10) of claim 1, wherein said at least one tear region divides said cover (10) in at least two sections (50) during deployment of the air bag (102), and wherein torn edges of the two sections rip open covering material which directly overlays the door.

11. An air bag deployment door (10) having a rim (22) and an outer boundary and an inner boundary, said inner boundary (26) defining the perimeter of a deployment opening, the rim (22) configured for being attached to a seat covering material such that upon fitting the covering material to a vehicle seat, the rim is in alignment with a cutout portion or deployment channel (114) in the vehicle seat (14).

12. The deployment door (10) of claim 11, wherein a cover (10) conceals an air bag module mounted within the seat.

13. The deployment door (10) of claim 12, wherein said rim (22) is sewn to the seat material (18).

14. The deployment door (10) of claim 11, wherein said rim (22) is glued to the seat material (18).

15. The deployment doer (10) of claim 12 wherein said cover (10) includes at least one tear region which tears along at least one predetermined path during deployment of the air bag (102).

16. The deployment door (10) of claim 15, wherein said predetermined path runs substantially along a center portion of the top of the cover (10).

17. The deployment door (10) of claim 12 wherein the seat material (18) directly overlays and conceals the cover (10).

18. A method of attaching an air bag deployment door (10) as defined in claim 1, having a wall portion (30) and crown (32) extending from a planar surface (28) of a rim (22) and defining the perimeter of a deployment region for an air bag, comprising the steps of:

positioning the deployment door (10) on the seat covering material (18) such that the deployment region substantially aligns with a deployment channel in the vehicle seat (14);

placing the seat covering material (18) about the rim, such that the seat covering material (18) lies beneath the planar surface (28); and attaching, including sewing or gluing, the front planar surface (28) to the seat material (18).

* * * * *